A. & E. ANTOINE.
SUGAR BOWL.
APPLICATION FILED MAY 2, 1914.

1,123,974.

Patented Jan. 5, 1915.

WITNESSES
Frank C. Palmer

INVENTORS
Aloise Antoine,
Ernest Antoine.
BY
ATTORNEYS

UNITED STATES PATENT OFFICE.

ALOISE ANTOINE AND ERNEST ANTOINE, OF PASSAIC, NEW JERSEY.

SUGAR-BOWL.

1,123,974.  Specification of Letters Patent.  Patented Jan. 5, 1915.

Application filed May 2, 1914. Serial No. 835,866.

*To all whom it may concern:*

Be it known that we, ALOISE ANTOINE and ERNEST ANTOINE, both citizens of the United States, and residents of Passaic, in the county of Passaic and State of New Jersey, have invented a new and Improved Sugar-Bowl, of which the following is a full, clear, and exact description.

Among the principal objects which the present invention has in view are: to provide a protective receptacle for deliquescent granular or pulverized substances; to provide means for delivering a measured quantity of the substance from the receptacle;
to generally provide a receptacle of the character mentioned with means for preventing unsanitary contact of the contents and extraneous matter; and to provide means for measuring the quantity of substance to be delivered.

Figure 1:
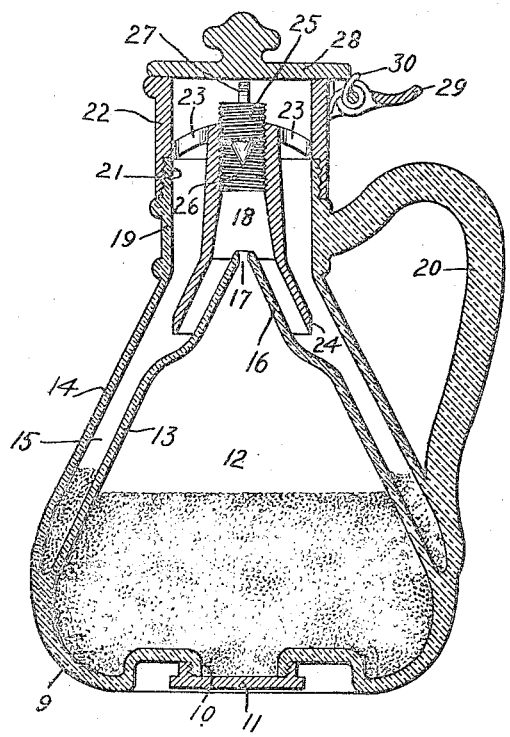
Figure 2:
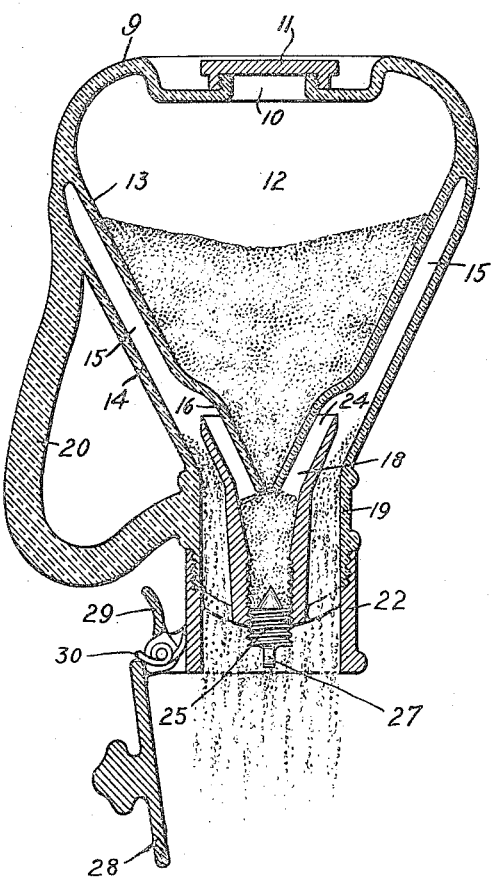
Figure 3:
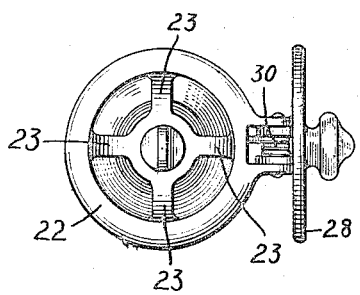
Figure 4:
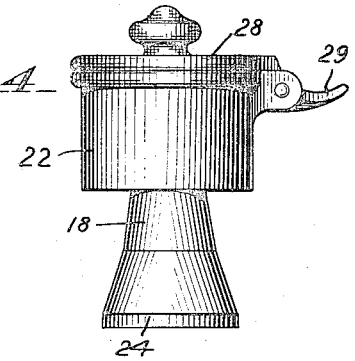

*Drawings.*—Figure 1 is a vertical section of a receptacle such as described, constructed and arranged in accordance with the present invention; Fig. 2 is a similar view showing the receptacle in the inverted or delivery position thereof; Fig. 3 is a detail view of the pouring neck, the cover thereof being shown in its raised position; Fig. 4 is a side elevation of the same, the cover being shown in the closed position.

*Description.*—As shown in the accompanying drawings, the bowl 9 is constructed of glass, and is provided at the center of the bottom with a neck portion 10. The neck portion 10 is externally threaded to engage and hold a cap nut cover 11. The cover 11 is employed to fill the inner receptacle 12 with sugar or other material for the distribution of which the utensil is provided.

The receptacle 12 is formed by an inner wall 13, which is spaced apart from the outer wall 14 to form an annular chamber or outer receptacle 15. The walls 13 and 14 unite to form the base or bottom of the bowl 9. At the upper end, the receptacle 12 is contracted to form a nozzle section, the wall 16 whereof is inset from the wall 13 forming the major portion of the receptacle 12. At the end of the nozzle, a pouring opening 17 is formed, to deliver the contents of the receptacle 12 to the measuring cup 18.

The upper end of the outer wall 14 is shaped to form the neck 19, to which the upper end of the handle 20 is secured, the lower end of said handle resting near the bulge or belly of the bowl 9. At the end of the neck 19, a screw-threaded section 21 is provided, the threads whereof engage the internal threads of a neck 22.

The neck 22 above referred to is preferably formed of metal, and supports the cup 18 by means of spider arms 23. The cup 18 is normally inverted, and is provided with a flared wall 24. The inner surface is inset from the line of the outer surface of the inner wall 13. By this arrangement, there is avoided a delivery of any of the contents of the receptacle 15 into the cup 18 when the receptacle is inverted to its pouring or delivery position.

The capacity of the cup 18, or the quantity of the material to be measured thereby, is determined by a screw plug 25. The plug 25 is threaded to register with the threaded section 26 of the cup 18. To manipulate the plug 25, it is provided with a wing nut 27. The nut and plug are exposed when the cover 28 is lifted.

The cover 28 is provided with a thumb-rest 29, which is held normally adjacent the handle 20 for the convenience of the person handling the utensil. A spring 30 is employed to hold the cover 28 firmly in its closed position.

It will be seen that when the utensil is inverted, as shown in Fig. 2 of the drawings, the material held in the receptacle 12 flows through the opening 17 into the cup 18 until the cup is filled sufficiently to choke the outflow from said opening. If, as shown by said figure, the outer receptacle 15 has been previously charged, the material held therein is delivered through the neck 22, being distributed in accordance with the direction imparted thereto by the operator. After the material has been delivered from the receptacle 15, the bowl is upturned to its normal position, when the material which has been deposited in the cup 18 will flow downward therefrom to the outside of the wall 16 and into the receptacle 15. The material thus measured will now be found in the bottom of the receptacle 15, and the bowl is in condition for again delivering the quantity of material therefrom. If for any reason it is desired to vary the quantity to be measured by the cup 18, the plug 25 is manipulated to reduce or increase the capacity of the cup 18.

Claims:

1. A bowl as characterized, comprising a double-walled receptacle, the walls of said receptacle being spaced apart and contracted to form circumjacent pouring openings; a pouring neck for said bowl incorporated with the outer of said walls; and a covered cup extending through said neck and enfolding the pouring opening formed by said inner wall.

2. A bowl as characterized, comprising a double-walled receptacle, the walls of said receptacle being spaced apart and contracted to form circumjacent pouring openings; a pouring neck for said bowl incorporated with the outer of said walls; a measuring cup extending in said neck in spaced relation to the wall thereof and provided with a flared pouring opening, circumfolding in spaced relation the pouring opening formed by said inner wall; and means adjustable in said cup for varying the holding capacity thereof.

3. A bowl as characterized, comprising a double-walled receptacle, the walls of said receptacle being spaced apart and contracted to form circumjacent pouring openings; a pouring neck for said bowl incorporated with the outer of said walls; a measuring cup extending in said neck in spaced relation to the wall thereof and provided with a flared pouring opening, circumfolding in spaced relation the pouring opening formed by said inner wall; and a movable bottom for said cup varying the holding capacity of said cup.

4. A bowl as characterized, comprising a double-walled receptacle, the walls of said receptacle being spaced apart and contracted to form circumjacent pouring openings; a pouring neck for said bowl incorporated with the outer of said walls; a measuring cup extending in said neck in spaced relation to the wall thereof and provided with a flared pouring opening, circumfolding in spaced relation the pouring opening formed by said inner wall; and a screw-threaded member mounted in said cup and forming the bottom thereof, said member being adjustable to vary the holding capacity of said cup.

5. A bowl as characterized, comprising a double-walled receptacle, the walls of said receptacle being spaced apart and contracted to form circumjacent pouring openings; a pouring neck for said bowl incorporated with the outer of said walls; a measuring cup extending in said neck in spaced relation to the wall thereof and provided with a flared pouring opening, circumfolding in spaced relation the pouring opening formed by said inner wall; a movable bottom for said cup varying the holding capacity of said cup; and a detachable neck mounted upon said pouring neck, said detachable neck being fixedly connected with said cup for supporting the same in said bowl.

6. A bowl as characterized, comprising a double-walled receptacle, the walls of said receptacle being spaced apart and contracted to form circumjacent pouring openings; a pouring neck for said bowl incorporated with the outer of said walls; a measuring cup extending in said neck in spaced relation to the wall thereof and provided with a flared pouring opening, circumfolding in spaced relation the pouring opening formed by said inner wall; a movable bottom for said cup varying the holding capacity of said cup; a detachable neck mounted upon said pouring neck, said detachable neck being fixedly connected with said cup for supporting the same in said bowl; and a cover pivotally mounted on said neck above said cup to close the entrance to said bowl.

7. A bowl as characterized, comprising a double-walled receptacle having a plurality of circumjacent pouring openings; an inverted measuring cup circumfolding the inner of said openings to limit the flow therefrom; a pouring member formed by the inner wall, said member being inset from the major portion of said wall to form a protecting shoulder for the lip of said cup; means for suspending said cup between said openings; and a screw plug forming the bottom of said cup, said plug being adjustable to vary the capacity of said cup.

8. A bowl as characterized, constructed from transparent material and comprising a double-walled receptacle, the walls whereof are circumjacent in spaced relation to form relatively outer and inner compartments, said outer compartment having an annular bottom raised above the bottom of the inner compartment; a pouring neck for said inner compartment, said neck being contracted adjacent the pouring opening thereof; and a measuring cup having a flared wall circumfolding said pouring neck in spaced relation thereto, said flared wall forming said inner compartment, said measuring cup being adapted to receive from said inner compartment and to deliver to said outer compartment to maintain constant the level of material in said outer compartment, irrespective of the level of the material in said inner compartment.

In testimony whereof we have signed our names to this specification in the presence of two subscribing witnesses.

ALOISE ANTOINE.
ERNEST ANTOINE.

Witnesses:
ANTON MÜLLER,
CHARLES KURTZO.